Patented May 16, 1944

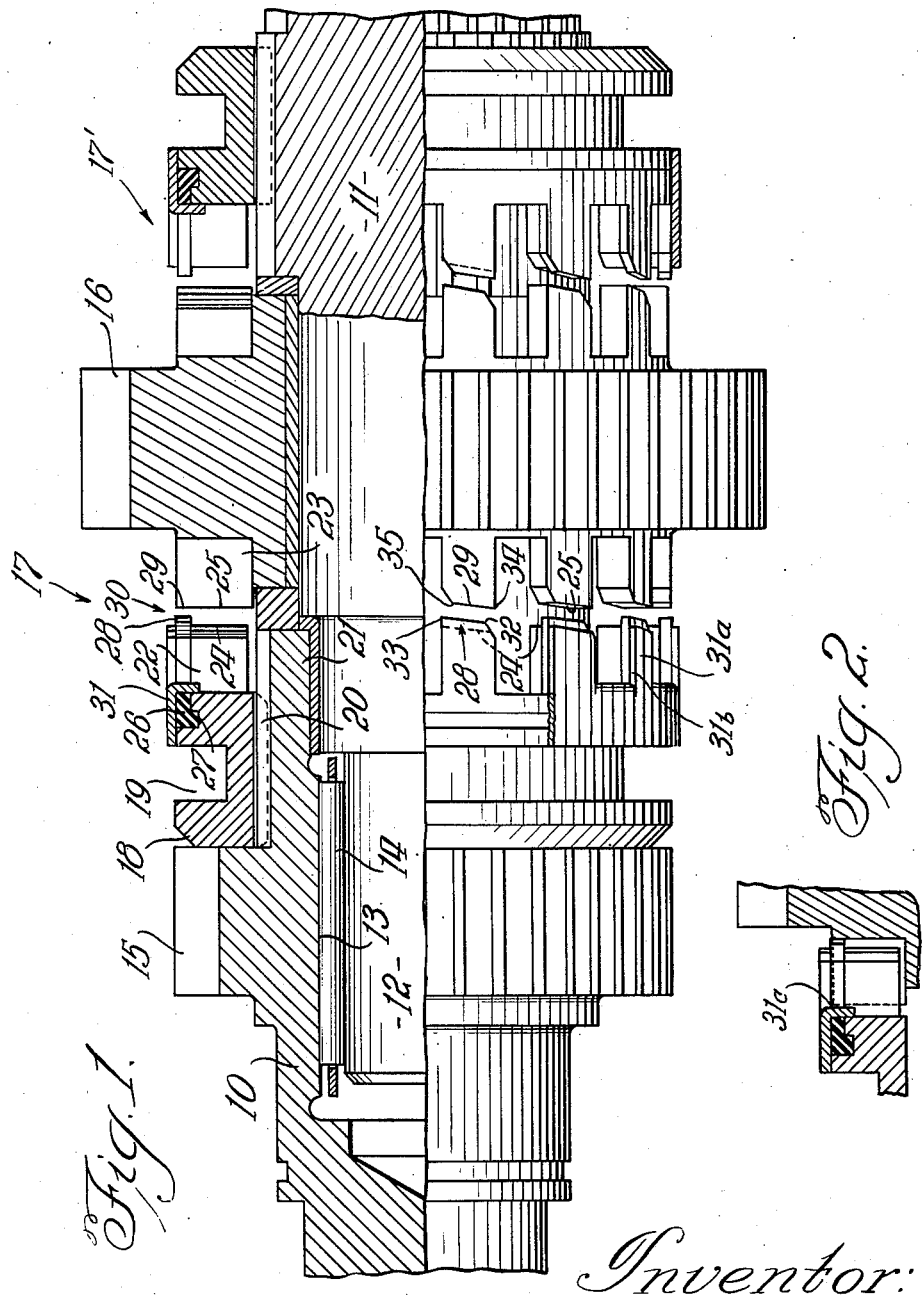

2,348,717

UNITED STATES PATENT OFFICE 2,348,717

QUIET-RATCHETING JAW CLUTCH

Oscar H. Banker, Evanston, Ill., assignor to New Products Corporation, Chicago, Ill., a corporation of Delaware Application January 5, 1942, Serial No. 425,626

10 Claims. (Cl. 192—67)

This invention has to do with jaw clutches and relates more particularly to silencing means therefor to minimize ratcheting noise when the jaws are urged together preparatory to meshing upon attaining synchronism.

The objects of this invention include the provision of a novel, inexpensive and effective structure operable to prevent contact between the teeth of the clutch components while they are rotating at different speeds, whereby the clashing thereof, incident to meshing, is avoided.

Another object is the provision in a jaw clutch of shock-absorbing ratchetable counterparts respectively upon the clutch components, and that are adapted, while ratcheting, to maintain the clutch teeth proper out of contact until substantial synchronism of the clutch components occurs, when said shock-absorbing counterparts reach a meshable condition together with a like meshable condition of the clutch teeth, to permit meshing of said teeth without clashing.

These and other desirable objects inherent and encompassed by the invention will later appear, and will be better understood from the ensuing description together with the annexed drawing, wherein:

Fig. 1 shows a preferred form of the invention in association with change-speed transmission gears; and Fig. 2 is a fragmentary view illustrating the meshed relation of the left-most clutch of Fig. 1.

Inasmuch as the present invention has special utility in combination with the jaw clutch structure of change-speed transmissions for motor vehicles, a fragmentary part of such a change-speed transmission is shown in the drawing as an environment for the invention, it being understood, however, that other numerous uses are contemplated.

Referring now to the drawing which is a fragmentary view, partly in section, showing parts of the drive and driven shafts of a change-speed transmission, together with gears respectively associated therewith and a jaw clutch, constructed according to the principles of the present invention, operable to connect one of the gears with the drive shaft:

10 designates the back end of the drive shaft and 11 the driven shaft which has a front end section 12 of reduced diameter piloted within a bearing recess 13 in the back end of the drive shaft, a set of needle bearings 14 being provided between the parts 12 and 13. A gear 15 integral with the drive shaft 10 is adapted, when certain connections (not shown) are established, to drive the driven shaft through speed reduction gearing (not shown). A gear 16 journalled upon the driven shaft 11 is also adapted to drive the driven shaft at a predetermined speed ratio with respect thereto when a driving connection including a gear train (not shown) is established between said gear and the driven shaft.

When this gear train (not shown) for enabling the gear 16 to drive the driven shaft is in operation said gear will be connected with the drive shaft 10 through a jaw clutch 17. This jaw clutch includes a shifter ring 18 with the usual shifter fork groove 19 and splined at 20 to a backwardly extending part 21 of the drive shaft. Meshable portions in the form of circumferentially spaced teeth 22 and 23 are respectively upon the back end of the shifter ring 18 and the front end of the gear 16.

In the operation of the transmission when a gear shift is made pursuant to the connection of the gear 16 with the drive shaft 10 through the clutch 17 the drive shaft will have been rotating at greater speed, clockwise as viewed from the front or left, than the gear 16. The ring 18, preparatory to effecting the connection by shifting the teeth 22 into mesh with the teeth 23, will be urged axially rearwardly toward the clutch component constituting the teeth 23 prior to synchronization of the shaft 10 and the gear 16 and hence of the drive and driven clutch components wherefore an objectionable ratcheting noise is made by the teeth 22 and 23 until synchronism is reached unless some means is provided to prevent engagement of the opposed end faces 24 and 25 of such teeth during the synchronization period. The present invention employs meshable cushioning means for preventing abutment between the teeth end faces 24 and 25, one counterpart of this meshable cushioning means 30 being in the form of a ring 26 circumscribing a cylindrical portion 27 of the ring 18 and having a plurality of axially backwardly directed projections 28 respectively radially aligned with the clutch teeth 22. The other counterpart of the meshable cushioning means is formed by the material of the driven clutch component between the spaces into which the clutch teeth 22 are projectable when the clutch is closed, and in this instance this material constitutes part of the teeth 23, namely, radial outward portions thereof and indicated at 29. The ring 26 and the projecting parts 28 thereof are made of a yieldable material such as neoprene or rubber, fabric reinforced if desired, to lend a yielding character to the meshable cushioning means. It will be noted that the projections 28 extend rearwardly slightly beyond the faces 24 of the teeth 22 so that, preparatory to meshing the teeth 22 and 23 while the drive and driven members 18 and 16 are unsynchronized the ratcheting will take place between the parts 28 and 29 and the ratcheting action is quiescent because of the yieldable projections 28. A metal band 31 may be placed about the outer periphery of the ring 26 for clamping the inner periphery thereof against the outer periphery of the cylindrical part 27 for securely clamping said ring 26 in position. Said band 31 is provided with backward projections 31a radially aligned with the teeth 22 for preventing centrifugal separation of the projections 28 from said teeth 22, and the notches 31b between the projections 31a permit the escape of oil whereby the accumulation of solid foreign matter sometimes carried thereby is prevented so as not to interfere with meshing of the teeth 22 and 23. Tangs 31c may be provided for bending radially inwardly between the roots of the teeth 22 and thus positively retain the yieldable ring 26 and the band 31 circumferentially aligned with the shifter ring 18.

Since the yieldable projections 28 and the parts 29 cooperable therewith during the ratcheting or synchronizing period are respectively radially aligned with the teeth 22 and 23, said parts 28 and 29 ultimately attain a state of substantially relative rotative immobility and the proper relative rotative relation for meshing simultaneously with these conditions being attained by the teeth 22 and 23 so that the parts 28 and 22 are simultaneously slidable into mesh with and between the parts 29 and 23.

Quietness in the ratcheting of the parts 28 and 29 is augmented by the fact that their opposed end faces are bevelled as illustrated in the lower part of the drawing where these parts are shown in elevation. Here it will be seen that the leading edges 32 of the end faces of the faster rotated parts 28 extend less distantly rearwardly than the trailing edges 33 of such end faces. The leading edges 34 of the end faces upon the parts 29 project forwardly a greater distance than the trailing edges 35 of such end faces. The resulting bevelling of the end faces of the parts 28 and 29 causes these end faces to abut flatly during ratcheting. In addition to reducing ratcheting noise, the contacting of the end faces over larger area increases their wearing ability.

A clutch 17' having parts respectively corresponding to those in the clutch 17 will be understood from the above description.

While I have herein shown and described a preferred embodiment with the view of fully illustrating the invention, it should be understood that the invention extends to other forms, arrangements, structures, and details falling within the scope and spirit thereof and not sacrificing all of its material advantages.

I claim:

1. In a jaw clutch having rotatable drive and driven members relatively movable axially to mesh portions thereof while the members are synchronized and in certain relative rotative relation, meshable cushioning means comprising counterparts respectively carried with said members about their rotational axis during their rotation, said counterparts having generally parallel opposed faces directed helically about their rotational axis for abutting in ratcheting relation to maintain said meshable portions axially apart during relative rotation of the members and being predeterminedly located circumferentially of said members to become positioned for meshing substantially in concert with said member portions attaining the aforesaid relative rotative relation, and at least one of said counterparts being yieldable, under the force of impact incurred between said counterparts pursuant to such ratcheting, to minimize ratcheting noise.

2. In a jaw clutch having rotatable drive and driven members relatively movable axially to mesh portions thereof while the members are synchronized and in certain relative rotative relation, meshable cushioning means comprising complemental ratcheting portions respectively rotatable with said members and disposed in opposed spaced relation axially of said members when the clutch is disengaged, one of said ratcheting portions having a series of spaces spaced circumferentially of its respective member and the other ratcheting portion constituting projecting means ratchetable against the material of the one ratcheting portion between said spaces therein and disposable within said spaces when axially aligned therewith while said members are synchronized, said ratcheting portions being so disposed axially of the members as to incur such ratcheting relation while maintaining said meshable portions of the members axially spaced and said projecting means and said spaces therefor being so located circumferentially of said members as to incur axial alignment of said spaces and projecting means when said members attain the aforesaid relative rotative relation, and one of said ratcheting portions being made of a resilient pliable material to minimize the noise of their ratcheting.

3. In a jaw clutch having rotatable drive and driven members having complemental meshable means in the form of circumferentially spaced projections on one of said members and like spaced spaces in the other of said members adapted to receive said projections when said members are moved axially together, meshable means comprising complemental ratcheting portions respectively rotatable with said members and disposed in opposed spaced relation axially thereof when the clutch is disengaged, one of said ratcheting portions constituting projections radially aligned with the teeth of the one member and projecting therebeyond axially toward the other member, the other of said ratcheting portions constituting material of the other member between the spaces therein in a radial sense and abuttable in ratcheting relation with said radially aligned projections when said members are rotating relatively and moved in axial approach preparatory to meshing said complemental meshable means, whereby said complemental meshable means is maintained separated until substantial synchronism of the members occurs, and one of said ratcheting portions being made of a pliable resilient material to minimize the noise of such ratcheting though being sufficiently firm to suffice for maintaining said complemental meshable means separated as aforesaid under the force of an applied pressure for meshing said complemental meshable means upon the occurrence of such synchronism.

4. In a jaw clutch comprising axially aligned relatively rotatable drive and driven members having radially extending and circumferentially spaced portions respectively thereon with end faces generally in opposed spaced relation while said members are axially spaced and said members being meshable by the disposition of said portions on each thereof within the spaces between those on the other pursuant to a relative axial movement of said members, cushioning means comprising pad-like parts of resilient pliable material upon one of said members in radial alignment with the end faces of said circumferentially spaced portions thereof so as to be meshable therewith in the spaces between said portions of the other member, the axial spacing of said pad-like parts and of the portion end faces upon the other member being less than that between the portion end faces of said members whereby said pads and said portion end faces of the other member are disposable in ratcheting relation while maintaining the portion end faces of the two members out of contact while said members are axially urged into mesh prior to their synchronization, and the material in said pads being sufficiently firm to resist crushing and to thus prevent contact of the end faces of said circumferentially spaced portions under pressures normally applied for meshing the clutch members.

5. In a jaw clutch comprising axially aligned relatively rotatable drive and driven members having radially extending and circumferentially spaced portions respectively thereon with end faces generally in opposed spaced relation while said members are axially spaced and said members being meshable by the disposition of said portions on each thereof within the spaces between those on the other pursuant to a relative axial movement of said members, cushioning means comprising pad-like parts of resilient pliable material upon one of said members in radial alignment with the end faces of said circumferentially spaced portions thereof so as to be meshable therewith in the spaces between said portions of the other member, and said pad-like parts projecting axially beyond the end faces of their associated member portions generally toward the end faces of the other member portions to enable said pad-like parts to ratchet relatively quietly over such end faces, though said parts having sufficient resistance to distortion to render them operable to maintain such portion end faces of the two members out of contact while said members are axially urged into mesh prior to their synchronization by the force normally applied to cause said members to mesh.

6. The combination set forth in claim 5, wherein one of said clutch members normally rotates faster than the other during such ratcheting of said pads and member portion end faces, said pads also having end faces presented against and cooperable with said member portion end faces during said ratcheting, the trailing edges of said ratcheting end faces associated with the normally faster rotating of said members being axially nearer to the normally slower rotating member than the leading edges of said faces, and the trailing edges of said faces associated with the normally slower rotating member being axially more distant from the faster rotating member than the leading edges of said faces to effect corresponding bevel of said ratcheting faces whereby they strike substantially flatly pursuant to such ratcheting.

7. In a jaw clutch comprising coaxial drive and driven members of which each has a group of circumferentially spaced parts placeable within the spaces between the parts of the other to effect meshing of said members when they are moved axially together, said parts having end faces disposed generally in opposed relation axially of said members when they are demeshed, a substantially silently operating meshing accessory member upon one of said members in concentric relation with the circumferentially arranged group of said parts thereon, and said member comprising portions of resiliently pliable material respectively radially aligned with said parts of said member and projecting axially therefrom beyond the end faces of said parts in position to ratchet over the end faces on the parts of the other member when said members are urged into meshing relation while unsynchronized, said portions of pliable material having ratcheting end faces for such ratcheting over said end faces on the parts of said other member, said ratcheting end faces being directed helically of the rotational axis of said members and the leading edges of such faces being projected less distantly than the trailing edges thereof.

8. A jaw clutch member, comprising a portion having a generally cylindrical periphery coaxial with said member and including axially directed teeth spaced circumferentially thereabout, a ratcheting silencer member in the form of a ring of resiliently compressible material disposed concentrically with said cylindrical periphery and having inner and outer peripheries of which one is engaged therewith, said ring also having axially projecting tooth-like portions respectively registering with said teeth radially of the member and projecting endwise beyond the ends of said teeth, and a retaining band arranged concentrically with and engaging the other periphery of said ring to facilitate retention of its assembly with the clutch member.

9. A jaw clutch member comprising a generally cylindrical end portion including circumferentially spaced teeth projecting endwise therefrom, a ratcheting silencer member in the form of a ring of resiliently compressible material arranged concentrically with said end portion and with its inner periphery engaged with the outer periphery of said portion, said ring also having axially projecting tooth-like portions extending axially along the outer peripheries of said teeth and projecting slightly beyond the ends thereof, and a retaining band contiguously circumscribing the outer periphery of said ring.

10. The combination set forth in claim 9, and wherein said retaining band also has axially projecting tooth-like portions extending axially along the outer peripheries of the tooth-like portions of said ring to resist radial displacement thereof by centrifugal force during rotation of said clutch member.

OSCAR H. BANKER.